United States Statutory Invention Registration [19]

[11] Reg. Number: H795

Maykut et al. [43] Published: Jul. 3, 1990

[54] REDUCED TEMPERATURE SENSITIVITY LAUNCH MOTOR

[75] Inventors: Albert R. Maykut; Jerrold H. Arszman, both of Huntsville, Ala.

[73] Assignee: The United States of America as represented by the Secretary of the Army, Washington, D.C.

[21] Appl. No.: 469,852

[22] Filed: Dec. 4, 1989

[51] Int. Cl.[5] ..... F02K 1/06

[52] U.S. Cl. ..... 239/265.15; 60/233; 60/238

*Primary Examiner*—Charles T. Jordan
*Assistant Examiner*—Michael J. Carone
*Attorney, Agent, or Firm*—Freddie M. Bush; James T. Deaton

[57] ABSTRACT

A rocket motor that has a main exhaust nozzle area and a secondary exhaust nozzle area with the secondary exhaust nozzle area being closed by burst discs that rupture and open secondary nozzle areas when predetermined temperatures and pressures are reached when propellant is burned inside the rocket motor.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REDUCED TEMPERATURE SENSITIVITY LAUNCH MOTOR

DEDICATORY CLAUSE

The invention described herein may be manufactured, used, and licensed by or for the Government for governmental purposes without the payment to us of any royalties thereon.

BACKGROUND OF THE INVENTION

A basic problem of in-tube burning rockets is the temperature sensitivity of the launch motor. The propellant burning rate is a function of its ambient temperature and increases or decreases with increases or decreases in the firing temperature. This behavior results in two undesirable characteristics in the launch motor design. First, the launch motor must completely burn out in the tube at the lowest firing temperature in which the weapon will be used. This results in a longer launch tube length than that needed for the nominal temperature operation. Since this burning time can be at a value twice that obtained at high temperature, the nominal burning time of the motor must be correspondingly shorter than would be the case without a temperature dependency. A second undesireable characteristic results from the fact that the increased burning rate at high temperatures causes higher chamber pressures which must be accommodated by added weight in the motor case and thus is responsible for further increases to total launch weight. The approach that has been taken in the past to ameliorate this problem is to improve on (lessen) the temperature sensitivity of the propellant thru the use of ballistic additives. While these improvements have resulted in temperature sensitivities that are considerably lower than the early propellants, propellant compromises have been made and some temperature sensitivity still remains.

Therefore, it is on object of this invention to provide a reduction in launch motor temperature sensitivity thru hardware modification rather than propellant formulation by the incorporation of a self-regulating combination of nozzle throats.

Other objects and advantages of this invention will be obvious to those skilled in this art.

SUMMARY OF THE INVENTION

A rocket motor that has a variable area exhaust nozzle area that is provided by having symmetrically arranged open nozzles and symmetrically arranged burst discs that close other nozzles that are opened only when predetermined temperatures and pressures are reached by burning propellant of the rocket motor to rupture the burst discs and open the other nozzles.

DESCRIPTION OF THE PREFERRED EMBODIMENT

Figure 1:
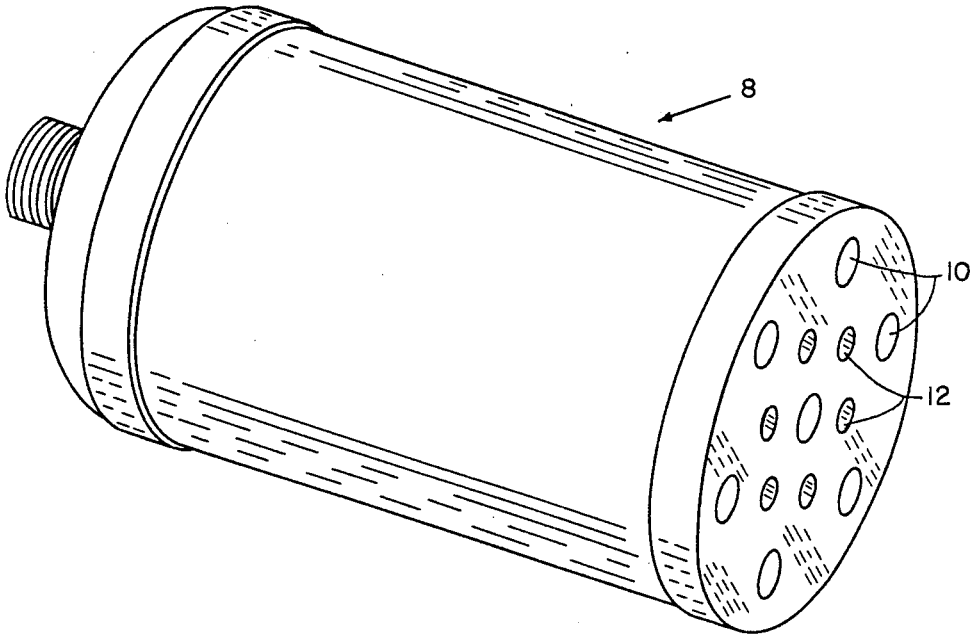
FIG. 1, is a perspective view of a rocket motor with main nozzles and burst disc controlled nozzles.

Referring now to FIG. 1, the main feature of this invention is a rocket motor 8 with a multiple set of nozzles, some of which are closed by pressure activated burst discs 12. In the illustration of FIG. 1, there are seven equally sized main nozzles 10 and six smaller burst disc controlled nozzles 12 arranged in a symmetric pattern. In a low temperature firing, the motor chamber pressure is insufficient to rupture burst discs 12 and only main nozzles 10 operate. At a higher temperature, the chamber pressure reaches a value sufficient to rupture the burst diaphragms on three of the six burst disc controlled nozzles 12. The resulting increase in throat area reduces the chamber pressure to values well below those that would occur without these additional nozzles in operation. Further increases in the firing temperature result in chamber pressures that become sufficiently high to rupture the burst discs 12 of the remaining three burst disc controlled nozzles resulting once again in a decrease in chamber pressure. The number of main nozzles is immaterial since it is the total area of the nozzles that control the resulting chamber pressure. The ratio of the area of main nozzles 10 to that of the control nozzles 12 is determined by the temperature sensitivity of the selected propellant. The number of burst disc controlled nozzles 12 is a function of the temperature sensitivity desired of the launch motor. The lower the temperature sensitivity desired, the greater the number of burst discs 12 controlled nozzle sets that must be used. In the illustration provided in FIG. 1, two sets of three burst disc controlled nozzles 12 are used, one set designed to open at an intermediate pressure, and one set designed to open at a slightly higher pressure. The symmetric arrangement is choosen to avoid the occurrence of thrust misalignment that would otherwise be encountered with a nonsymmetric nozzle flow pattern.

Figure 2:
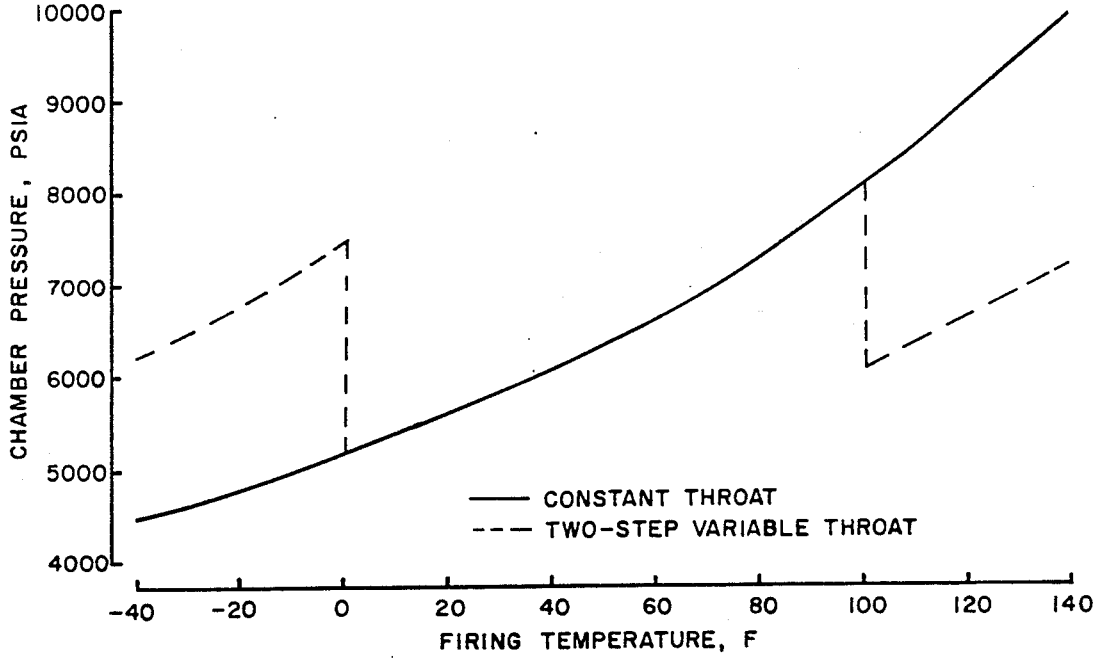
FIG. 2, is a graph showing the operating characteristic of a rocket motor with conventional nozzle structure compared to a rocket motor with nozzle structure in accordance with this invention.

The operating chamber pressure of the improved structual arrangement just discussed is shown as a function of the ambient firing temperature in FIG. 2. The solid line represents the operating chamber pressure curve for a conventional motor not having burst disc controlled nozzles, while the dashed line represents the operating characteristics of the improved structure incorporating the burst disc controlled nozzles 12. The conventional structure has a fixed set of nozzles having a total throat area equal to the throat area of the improved structure with half of the burst disc controlled nozzles open. By comparison, the improved structure operates at a higher chamber pressure than the conventional structure at low temperature. For this illustration, the chamber pressure of the improved structure reaches a value sufficient to rupture the burst discs at 0° F. and the chamber pressure drops to that of the conventional structure, since the total throat area of each arrangement is equal. The operating characteristics of each arrangement remains identical until a temperature of 100° F. is reached, where the chamber pressure reaches a value sufficient to rupture the remaining set of burst discs 12 and then the chamber pressure once again is reduced. The improvement in operating characteristic is evident in the narrowing of the chamber pressure range that occurs over the firing temperature range. In this example, a reduction in chamber pressure variation of over 50% is achieved.

We claim:

1. A rocket motor having a main area nozzle means for exhausting gases from the rocket motor and a secondary nozzle area means that is closed by burst disc means that rupture upon predetermined temperature and pressure being reached inside said rocket motor to initially reduce the temperature and pressure of burning propellant within said rocket motor.

2. A rocket motor as set forth in claim 1, wherein said main area nozzle means is symmetrically arranged relative to said rocket motor and said secondary nozzle area means that is closed by said burst disc means is also symmetrically arranged relative to said rocket motor.

3. A rocket motor as set forth in claim 2, wherein said burst disc means is plural in number and said burst disc means is designed to rupture at different temperatures and pressures to provide at least two steps of rupturing of said burst disc means to reduce the temperature and pressure of the rocket motor twice.

* * * * *